United States Patent
Kozloski et al.

(10) Patent No.: US 9,945,688 B2
(45) Date of Patent: *Apr. 17, 2018

(54) ROUTE PLANNING TO REDUCE EXPOSURE TO RADIATION

(71) Applicant: INTERNATIONAL BUSINESS MACHINES CORPORATION, Armonk, NY (US)

(72) Inventors: James R. Kozloski, New Fairfield, CT (US); Clifford A. Pickover, Yorktown Heights, NY (US); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/172,409

(22) Filed: Jun. 3, 2016

(65) Prior Publication Data

US 2017/0023378 A1    Jan. 26, 2017

Related U.S. Application Data

(63) Continuation of application No. 14/798,697, filed on Jul. 14, 2015, now Pat. No. 9,435,659.

(51) Int. Cl.
*G01C 21/36* (2006.01)
*G01C 21/34* (2006.01)
(Continued)

(52) U.S. Cl.
CPC ........ *G01C 21/3691* (2013.01); *G01C 21/20* (2013.01); *G01C 21/3453* (2013.01);
(Continued)

(58) Field of Classification Search
CPC ............ G01C 21/3461; G01C 21/3691; G01C 21/20; G01C 21/3453; G01T 1/02;
(Continued)

(56) References Cited

U.S. PATENT DOCUMENTS

2008/0111073 A1    5/2008  Bushberg
2011/0313651 A1*  12/2011  Hyde ...................... G08B 3/10
                                                                    701/400

(Continued)

OTHER PUBLICATIONS

James R. Kozloski et al., "Route Planning to Reduce Exposure to Radiation", U.S. Appl. No. 14/798,697, filed Jul. 28, 2015.
(Continued)

*Primary Examiner* — Yuen Wong
(74) *Attorney, Agent, or Firm* — Cantor Colburn LLP; Vazken Alexanian

(57) ABSTRACT

Embodiments include method, systems and computer program products for route planning to reduce exposure to radiation. Aspects include receiving an origin and a destination for a vehicle and determining a plurality of available routes between the origin and the destination. Aspects also include calculating, by a processor, a radiation score for each of the plurality of available routes and presenting one or more of the plurality of available routes with an expected travel time and the radiation score for each of the plurality of available routes.

18 Claims, 4 Drawing Sheets

(51) Int. Cl.
  *G01C 21/20* (2006.01)
  *G08G 5/00* (2006.01)
  *G01T 1/02* (2006.01)
(52) U.S. Cl.
  CPC ............ *G01C 21/3461* (2013.01); *G01T 1/02* (2013.01); *G08G 5/0021* (2013.01); *G08G 5/0034* (2013.01); *G08G 5/0039* (2013.01); *G08G 5/0091* (2013.01)
(58) Field of Classification Search
  CPC .. G08G 5/0021; G08G 5/0034; G08G 5/0039; G08G 5/0091
  See application file for complete search history.

(56) References Cited

U.S. PATENT DOCUMENTS

2013/0166245 A1   6/2013   Samari
2015/0009044 A1   1/2015   Weinberg et al.

OTHER PUBLICATIONS

List of IBM Patents or Patent Applications Treated as Related; (Appendix P), Filed Aug. 5, 2016; 2 pages.

* cited by examiner

ROUTE PLANNING TO REDUCE EXPOSURE TO RADIATION

PRIORITY

This application is a continuation of U.S. patent application Ser. No. 14/798,697, filed Jul. 14, 2015 entitled "Route Planning To Reduce Exposure To Radiation", the content of which is incorporated herein by reference in its entirety.

BACKGROUND

The present disclosure relates to reducing exposure to radiation during travel, and more specifically, to methods, systems and computer program products for route planning to reduce exposure to radiation.

Radiation exposure to the human body and to electronic devices is a growing concern, particularly for people who live in high-altitude regions and for people who regularly fly certain routes in airplanes. In general, exposure to radiation is dependent on both time and location and radiation exposure levels during flight vary quite strongly with both altitude and latitude. During flight there are two principal sources of natural radiation to consider Galactic Cosmic Rays (GCR), which are always present, and Solar Energetic Particle (SEP) events, sometimes called Solar Cosmic Ray (SCR) events, which occur sporadically. According to various sources, GCR provide an inescapable radiation background which varies over the solar cycle of about 11 years. GCR are at maximum level when solar activity is at a minimum and vice-versa.

In general, people are continually exposed to radiation doses equivalent to about 6 to 12 uSv (micro Sieverts) per day at sea-level due to GCR and radiation from the ground which is dependent on location. A two-hour flight at conventional altitudes (20,000-40,000 ft.) approximately doubles a person's radiation dose for the day. Accordingly, passengers and crew members flying on flights on a North Pole route between New York and Hong Kong are exposed to unusually high levels of cosmic and solar radiation. Likewise, people living in the high mountains of Colorado experience radiation levels that exceed three times the average in the USA, because of radon and granitic elements.

In addition to posing health risks to people, increased radiation exposure can also have negative impacts on the functionality of many commonly used electronic devices.

SUMMARY

In accordance with an embodiment, a method for route planning to reduce exposure to radiation is provided. The method includes receiving an origin and a destination for a vehicle and determining a plurality of available routes between the origin and the destination. The method also includes calculating, by a processor, a radiation score for each of the plurality of available routes and presenting one or more of the plurality of available routes with an expected travel time and the radiation score for each of the plurality of available routes.

In accordance with another embodiment, a system for route planning to reduce exposure to radiation includes a processor and a user interface, the processor being configured to perform a method. The method includes receiving an origin and a destination for a vehicle and determining a plurality of available routes between the origin and the destination. The method also includes calculating a radiation score for each of the plurality of available routes and presenting one or more of the plurality of available routes with an expected travel time and the radiation score for each of the plurality of available routes.

In accordance with a further embodiment, a computer program product for route planning to reduce exposure to radiation includes a non-transitory storage medium readable by a processing circuit and storing instructions for execution by the processing circuit for performing a method. The method includes receiving an origin and a destination for a vehicle and determining a plurality of available routes between the origin and the destination. The method also includes calculating a radiation score for each of the plurality of available routes and presenting one or more of the plurality of available routes with an expected travel time and the radiation score for each of the plurality of available routes.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with exemplary embodiments of the disclosure, methods, systems and computer program products for route planning to reduce exposure to radiation are provided. In exemplary embodiments, conventional methods of route planning are modified to account for the exposure risks of radiation associated with available routes. As used herein, route planning may include planning travel routes for vehicles such as automobiles, airplanes, or the like. In exemplary embodiments, the route planning method reduces the exposure to radiation of an individual or an electronic device in a vehicle by selecting routes that reduce exposure to radiation when more than one route is available.

Figure 1:
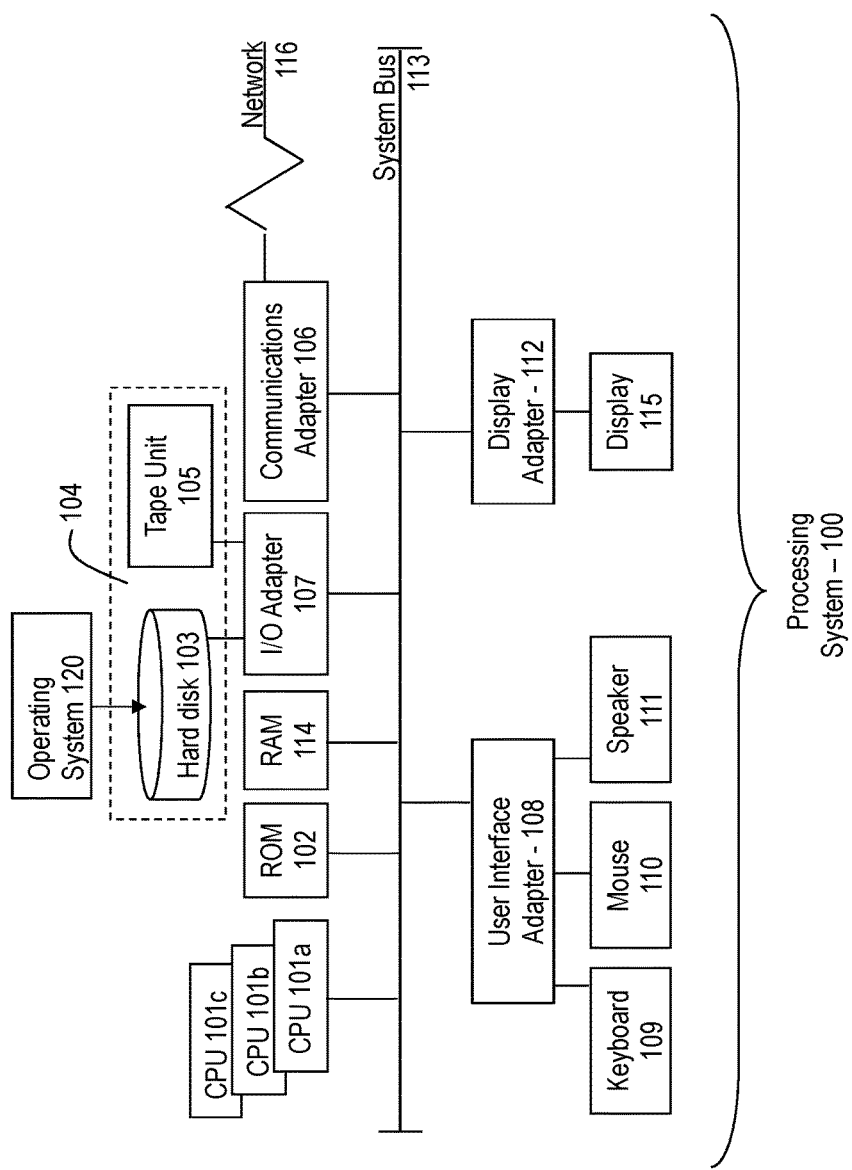
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI).

Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
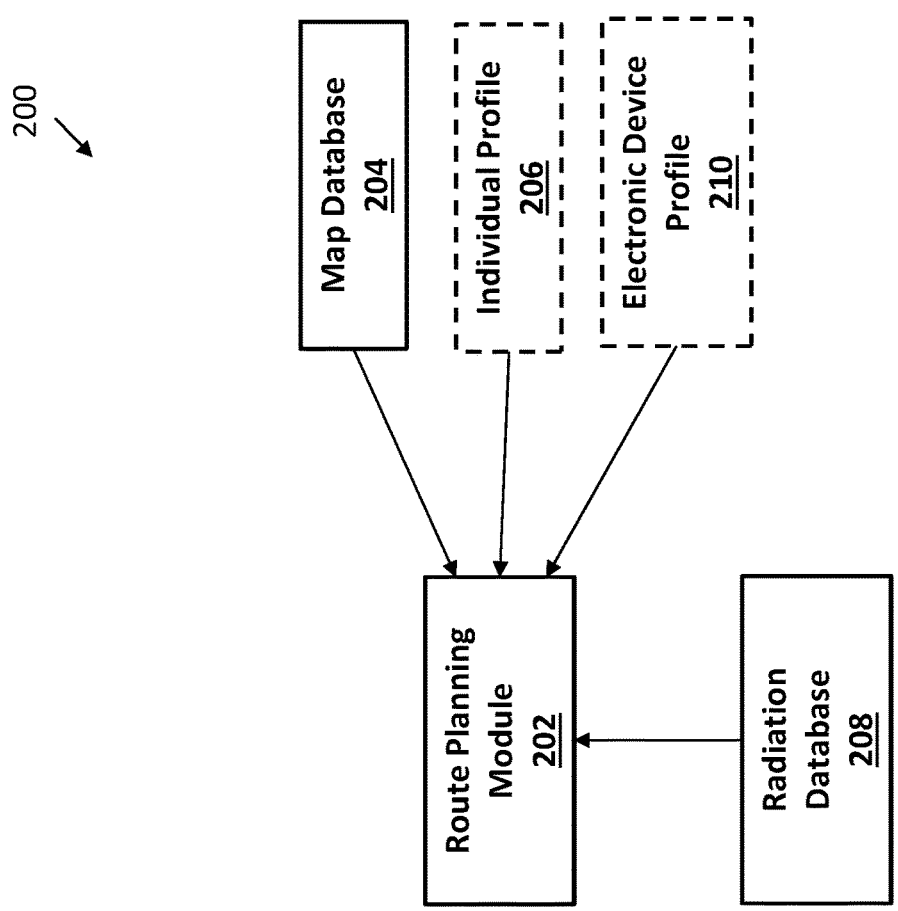
FIG. 2 is a block diagram illustrating a system for route planning to reduce exposure to radiation in accordance with exemplary embodiments.

Referring now to FIG. 2, a system 200 for route planning to reduce exposure to radiation in accordance with exemplary embodiment is shown. In exemplary embodiments, the system 200 may be embodied on a computing system similar to the one shown in FIG. 1. The system 200 includes a route planning module 202 which receives an origin and destination input for a vehicle (not shown). The route planning module 202 is configured to receive data from a radiation database 208, a map database 204, and optionally from an individual profile 206 and an electronic device profile 210. In one embodiment, the route planning module 202 uses the information from the map database 204 to calculate multiple routes from the origin to the destination. In another embodiment, the map database 204 may be configured to receive the origin and destination from the route planning module 202 and to return multiple routes from the origin to the destination to the route planning module 202. In exemplary embodiments, each of the multiple routes from the origin to the destination includes an indication of the expected travel time. The indication of the expected travel time may be a distance of the route, a mean travel time on the route, a median travel time on the route, or the like.

In exemplary embodiments, the route planning module 202 queries the radiation database 204 based on the information associated with each of the available routes from the origin to the destination. The route planning module 202 receives radiation information from the radiation database 204 and responsively calculates a radiation score for each of the routes. In exemplary embodiments, the radiation database 208 may include historical radiation information, altitude information for various routes, or the like. The data may also include radiation forecasts, such as provided by a space weather service, a solar observatory, etc. In exemplary embodiments, once the radiation scores for each of the available routes from the origin to the destination are calculated, the route planning module 202 may automatically select a route or may provide a list of routes for selection.

In exemplary embodiments, when providing a list of routes to the user the radiation score of the route may be displayed to the user along with the indication of the expected travel time. Alternately, the routes and the radiation scores may be provided via an API to a route planning service that makes the selection of the route. By allowing a user or service to select a route based on a combination of the expected travel time and upon the radiation score of the available routes, more informed travel decisions based on certain risk tolerances for radiation exposure can be made. For example, a driver may tolerate adding 10 minutes to his or her trip, if it reduces radiation exposure to the driver or the driver's devices. In exemplary embodiments, the route planning module 202 may track estimated radiation exposure through the estimated travel time along the route to calculate the radiation score for the route.

In exemplary embodiments, the route planning module 202 is in communication with a user profile 206 of an individual traveling in the vehicle. The user profile 206 can include a user's routing preferences and medical information for a user, such as a radiation history of a user due to medical tests and other conditions or exposures. For example, a user profile 206 may include whether a user wants to allow automatic route selection or if the user prefers manual selection, a maximum radiation score allowable for a route during automatic selection, a cumulative radiation score for the user, a maximum allowable radiation exposure level for a time period, an age of the user, a medical condition of the user (e.g., is the user pregnant), or the like. In exemplary embodiments, the route planning module 202 is configured to calculate the radiation score for available routes based on the medical information of the user stored in the user profile 206. Accordingly, the radiation score for a given route for a first user may be different than a radiation score for a second user on the same route.

In exemplary embodiments, the route planning module 202 is in communication with an electronic device profile 210 of an electronic device disposed within the vehicle. The electronic device profile 210 can include a radiation exposure status may be associated with an electronic device that quantifies the tolerance of the electronic device to exposure to radiation. For example, the radiation exposure status may reflect the probability that radiation exposure will cause a loss of GPS connectivity, memory errors, software program crashing, etc. in the electronic device.

In exemplary embodiments, the route planning module 202 may be used to provide real-time route guidance for the vehicle and may be configured to re-route the vehicle based on changes that affect the route, such as traffic and weather. In exemplary embodiments, the route planning module 202 may be configured to generate warnings if the vehicle is approaching an area that has a radiation level of concern, so that the user can take action, such as utilizing a different route. Such warnings may be triggered by a radiation level exceeding a threshold for an individual traveling in the vehicle or an electronic device disposed in the vehicle. In exemplary embodiments, the radiation level used to generate a warning may be based on information in the individual profiles 206 and electronic device profiles 210 as well as the radiation database 208. For example, the user profile 206 may store a maximum radiation exposure level for a user that is used to trigger a warning when an expected radiation level exceeds the maximum radiation exposure level. It will be appreciated by those of ordinary skill in the art that the vehicle may include multiple individuals and electronic devices and that the radiation score may be based on a mean, median, or a minimum/maximum radiation tolerance level for the individuals and electronic devices.

In one embodiment, the route planning module 202 is configure to find an optimal route for travel in a car in a variable terrain to reduce radiation risk from an origin at point A, with an altitude of 1000 feet, to a destination at point B, with an altitude of 1000 feet, while not spending more than a half hour at an altitude of greater than 5000 feet. Although this may seem like a small difference in radiation dose, over the course of a few years, it could become significant because some drivers spend a vast amount of times on the road, e.g., truck drivers, bus drivers, fleet drivers, taxi drivers. In addition, high-latitude air travelers can also be exposed to significant doses of radiation during solar storms, and the route planning module 202 may take into account forecasts and real-time information.

In exemplary embodiments, the route planning module 202 may plan routes to minimize the effect of radiation on electronic devices in addition to individuals. The electronic devices may include medical device, GPS devices, or devices dependent on GPS, such as autonomous vehicles, or the like. In exemplary embodiments, a radiation exposure status may be associated with an electronic device that quantifies the tolerance of the electronic device to exposure to radiation. For example, the radiation exposure status may reflect the probability that radiation exposure will cause a loss of GPS connectivity, memory errors, software program crashing, etc. in the electronic device.

Figure 3:
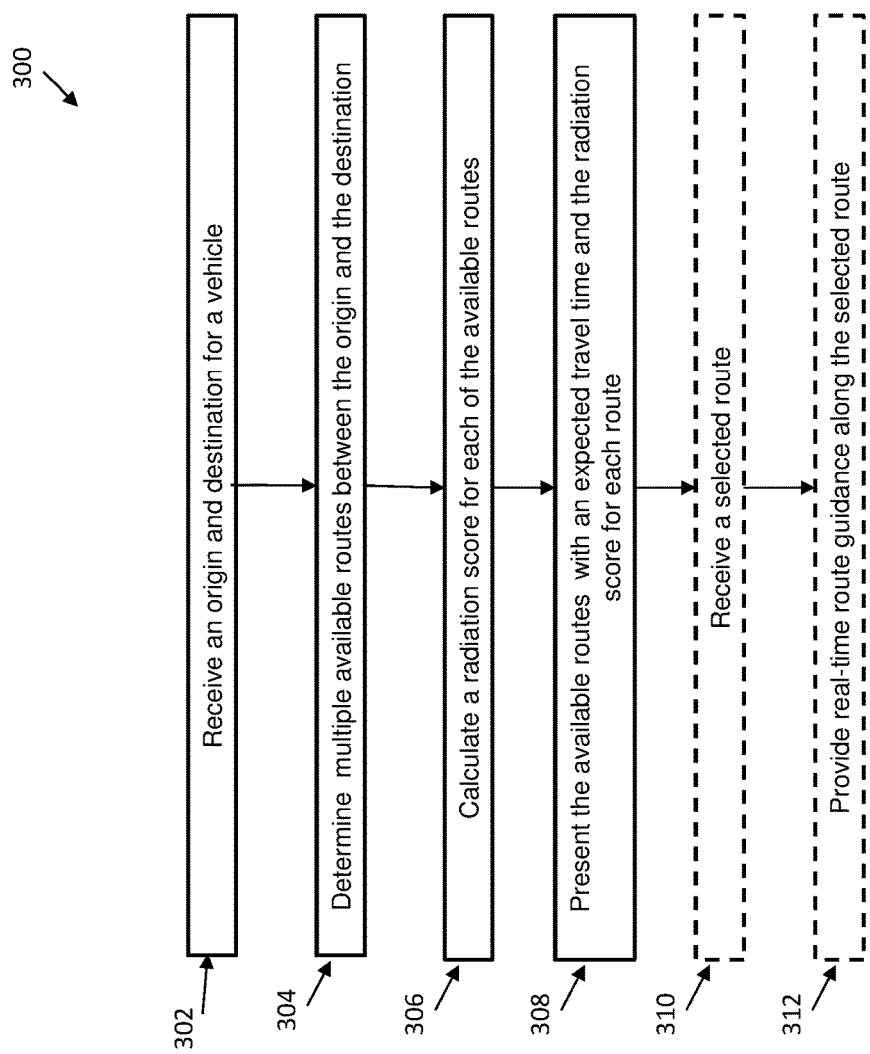
FIG. 3 is a flow diagram of a method for route planning to reduce exposure to radiation in accordance with an exemplary embodiment.

Referring now to FIG. 3, a flow diagram of a method 300 for route planning to reduce exposure to radiation in accordance with an exemplary embodiment is shown. As shown at block 302, the method 300 includes receiving an origin and destination for a vehicle. Next, as shown at block 304, the method 300 includes determining multiple available routes between the origin and the destination. The method 300 also includes calculating a radiation score for each of the available routes, as shown at block 306. In exemplary embodiments, calculating a radiation score for each of the available routes includes estimating radiation levels R along each of the available routes between the origin and the destination (e.g. by tracking altitude along each of the available routes). In exemplary embodiments, calculating a radiation score for each of the available routes also includes estimating cumulative exposure E to radiation for an individual in the vehicle (e.g. from a history of travelling and medical tests). In exemplary embodiments, calculating a radiation score for each of the available routes also includes estimating a health status H for an individual in the vehicle (e.g. through a user profile indicating pregnancy, age, history of cancer, etc.). In exemplary embodiments, calculating a radiation score for each of the available routes also includes estimating a radiation exposure status S for an electronic device in the vehicle (e.g. probability of a loss of GPS connectivity, memory errors, software program crashing, etc). Next, as shown at block 308, the method 300 includes presenting the available routes with an indication of an expected travel time and the radiation score for each route. The method 300 may also include receiving a selected route, as shown at block 310, and providing real-time route guidance along the selected route, as shown at block 312.

Figure 4:
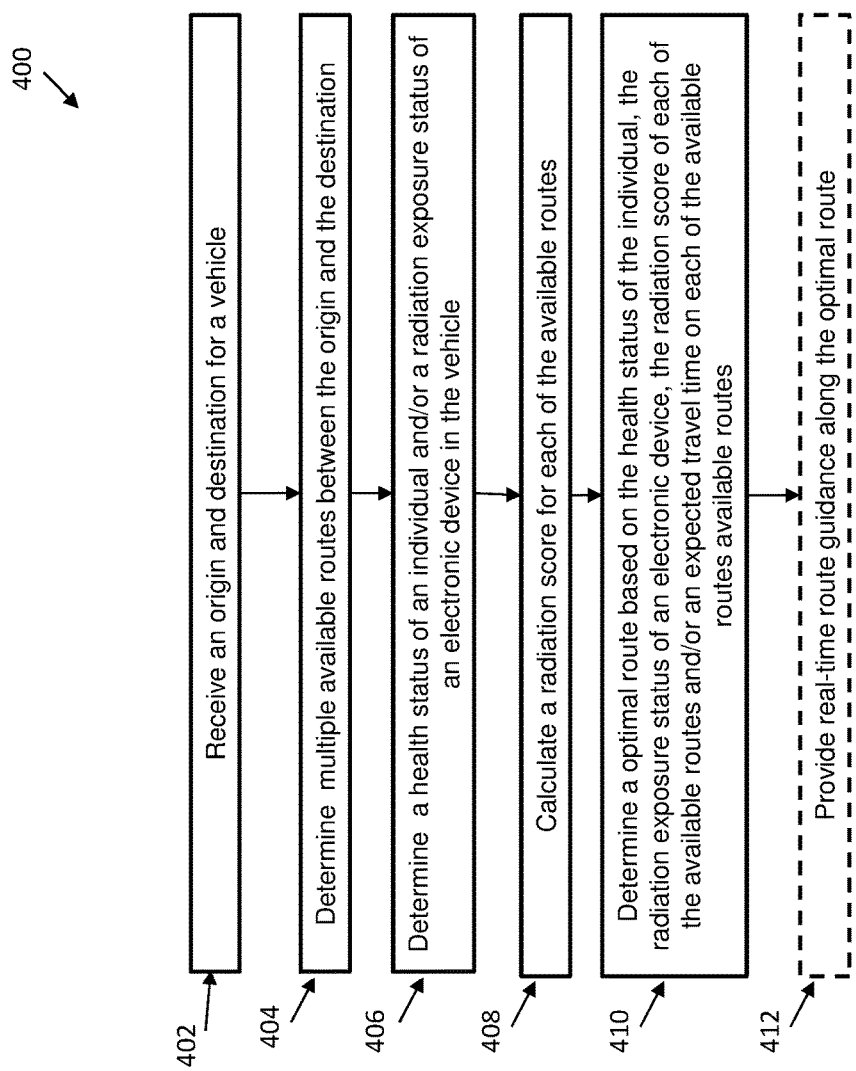
FIG. 4 is a flow diagram of another method for route planning to reduce exposure to radiation in accordance with an exemplary embodiment.

Referring now to FIG. 4, a flow diagram of a method 400 for route planning to reduce exposure to radiation in accordance with an exemplary embodiment is shown. As shown at block 402, the method 400 includes receiving an origin and destination for a vehicle. Next, as shown at block 404, the method 400 includes determining multiple available routes between the origin and the destination. The method 400 also includes determining a health status of the user and/or a radiation exposure status of an electronic device in the vehicle, as shown at block 406. In exemplary embodiments, determining a health status of the user includes estimating a health status H of a user based on a network N of related users (e.g. based on the similarity of routes, health conditions, new discoveries or creation of sources of radiation through mining, the use of a learning module to learn and correlate health records information, the use of crowd-enabled GPS system and on-line forums, and the like. In exemplary embodiments, determining a health status of the user includes retrieving user medical information from an individual profile of the individual. In exemplary embodiments, determining a radiation exposure status of an electronic device includes retrieving information from an electronic device profile of the electronic device.

The method 400 also includes calculating a radiation score for each of the available routes, as shown at block 408. In exemplary embodiments, calculating a radiation score for each of the available routes includes estimating radiation levels R along each of the available routes between the origin and the destination (e.g. by tracking altitude along each of the available routes). In exemplary embodiments, calculating a radiation score for each of the available routes includes estimating radiation levels R along each of the available routes between the origin and the destination (e.g. by tracking altitude along each of the available routes). In exemplary embodiments, calculating a radiation score for each of the available routes also includes estimating cumulative exposure E to radiation for an individual in the vehicle (e.g. from a history of travelling and medical tests). In exemplary embodiments, calculating a radiation score for each of the available routes also includes estimating a health status H for an individual in the vehicle (e.g. through a user profile indicating pregnancy, age, history of cancer, etc.). In exemplary embodiments, calculating a radiation score for each of the available routes also includes estimating a radiation exposure status S for an electronic device in the vehicle (e.g. probability of a loss of GPS connectivity, memory errors, software program crashing, etc). Next, as shown at block 410, the method 400 includes determining an optimal route based on the health status of the user, the radiation exposure status of an electronic device, the radiation score of each of the available routes and an expected travel time on each of the available routes available routes. In exemplary embodiments, the optimal route may be selected based on a combination of R, E, S and H. The method 400 may also include providing real-time route guidance along the optimal route, as shown at block 412.

In exemplary embodiments, the systems and methods for system for route planning to reduce exposure to radiation may be embodied in self-driving cars (SDCs), which make use of GPS for safe operation. Solar storms have been known to interfere with GPS, and could therefore reduce the safety of SDCs. The systems and methods for system for route planning to reduce exposure to radiation prevents such interference by planning routes in advance based on estimates of energetic storms location and influences to on board GPS devices as well as GPS satellites, and allowing vehicles to enter a safe mode in advance of complete GPS blackout.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for route planning utilizing a Global Positioning System (GPS) device to reduce cumulative exposure to the GPS device travelling in a vehicle to radiation along a plurality of available routes over a period of time, the method comprising:
   providing the GPS device;
   providing an electronic device profile that quantifies a tolerance of the GPS device to exposure to radiation;

receiving an origin and destination by at least one processor of the GPS device for the vehicle;

determining the plurality of available routes between the origin and the destination;

determining a radiation exposure status of the GPS device in the vehicle;

retrieving radiation information about at least one natural source of radiation from the environment along the route, by the at least one processor, from a radiation database, the radiation database including historical radiation information, altitude radiation, and solar radiation forecasts provided by either a space weather service or a solar observatory, wherein the at least one natural sources of radiation is selected from the group consisting of Galactic Cosmic Rays (GCR), Solar Energetic Particle (SEP), radon and granitic elements;

generating, by the at least one processor, from a map database the plurality of available routes from the origin to the destination;

in response to generating, by the at least one processor, from the map database the plurality of available routes from the origin and the destination, calculating, by the at least one processor, a radiation score for each of the plurality of available routes along each of the plurality of available routes from the origin to the destination based on the retrieved radiation information from the radiation database;

in response to calculating, by the at least one processor, the radiation score for each of the plurality of available routes, estimating, by the at least one processor, the cumulative exposure to radiation for the GPS device going to receive from the at least one natural source of radiation while travelling along each of the plurality of available routes;

in response to estimating, by the at least one processor, the cumulative exposure to radiation by the GPS device, presenting an optimal route on a display screen based on an expected travel time and the radiation score for each of the plurality of available routes; and monitoring, by the at least one processor, the cumulative exposure to radiation in real-time and provide on the display screen real-time guidance along the optimal route for the GPS device.

2. The method of claim 1, wherein calculating the radiation score for each of the plurality of available routes includes estimating radiation levels along each of the plurality of available routes between the origin and the destination.

3. The method of claim 1, further comprising receiving a selected route from the one or more of the plurality of available routes and providing real-time route guidance along the selected route.

4. The method of claim 1, wherein the radiation score for each of the available routes is calculated based on a combination of at least the radiation exposure status of the GPS device and an estimated radiation level along each of the plurality of available routes between the origin and the destination.

5. The method of claim 1, further comprising determining the optimal route based on a combination of the radiation exposure status of the GPS device, the radiation score of each of the plurality of available routes and an expected travel time on each of the plurality of available routes.

6. A non-transitory storage medium readable by a processing circuit and storing instructions for execution by the processing circuit for performing a method for route planning utilizing a Global Positioning System (GPS) device to reduce cumulative exposure to the GPS device travelling in a vehicle to radiation along a plurality of available routes over a period of time, the method comprising:

receiving an origin and a destination for the vehicle;

determining a radiation exposure status of the GPS device in the vehicle;

retrieving radiation information about at least one natural source of radiation from the environment along the route, by at least one processor, from a radiation database, the radiation database including historical radiation information, altitude radiation, and solar radiation forecasts provided by either a space weather service or a solar observatory, wherein the at least one natural sources of radiation is selected from the group consisting of Galactic Cosmic Rays (GCR), Solar Energetic Particle (SEP), radon and granitic elements;

generating, by the at least one processor, from a map database the plurality of available routes from the origin to the destination;

in response to generating, by the at least one processor, from the map database the plurality of available routes from the origin and the destination, calculating, by the at least one processor, a radiation score for each of the plurality of available routes along each of the plurality of available routes from the origin to the destination based on the retrieved radiation information from the radiation database;

in response to calculating, by the at least one processor, the radiation score for each of the plurality of available routes, estimating, by the at least one processor, the cumulative exposure to radiation for the GPS device going to receive from the at least one natural source of radiation while travelling along each of the plurality of available routes;

in response to estimating, by the at least one processor, the cumulative exposure to radiation by the GPS device, presenting an optimal route on a display screen based on an expected travel time and the radiation score for each of the plurality of available routes; and monitoring, by the at least one processor, the cumulative exposure to radiation in real-time and provide on the display screen real-time guidance along the optimal route for the GPS device.

7. The non-transitory storage medium of claim 6, wherein calculating the radiation score for each of the plurality of available routes includes estimating radiation levels along each of the plurality of available routes between the origin and the destination.

8. The non-transitory storage medium of claim 6, further comprising receiving a selected route from the one or more of the plurality of available routes and providing real-time route guidance along the selected route.

9. The non-transitory storage medium of claim 6, further comprising determining at least one of a health status of an individual in the vehicle and a radiation exposure status of the GPS device in the vehicle.

10. The non-transitory storage medium of claim 9, wherein calculating the radiation score for each of the plurality of available routes includes estimating the cumulative exposure to radiation for the individual based on the health status of the individual.

11. The non-transitory storage medium of claim 9, wherein the radiation score for each of the available routes is calculated based on a combination of at least two of the health status of the individual, the radiation exposure status of the GPS device and an estimated radiation level along each of the plurality of available routes between the origin and the destination.

12. The non-transitory storage medium of claim 9, further comprising determining the optimal route based on a combination of at least two of the health status of the individual, the radiation exposure status of the GPS device, the radiation score of each of the plurality of available routes and the expected travel time on each of the plurality of available routes.

13. A system for route planning utilizing a Global Positioning System (GPS) device to reduce cumulative exposure to the GPS device travelling in a vehicle to radiation along a plurality of available routes over a period of time, the system comprising:
  a processor of the GPS device configured to:
    receive an origin and destination;
    determine a plurality of available routes between the origin and the destination;
    determine a radiation exposure status of the GPS device in the vehicle;
    retrieve radiation information about at least one natural source of radiation from the environment along the route, by at least one processor, from a radiation database, the radiation database including historical radiation information, altitude radiation, and solar radiation forecasts provided by either a space weather service or a solar observatory, wherein the at least one natural sources of radiation is selected from the group consisting of Galactic Cosmic Rays (GCR), Solar Energetic Particle (SEP), radon and granitic elements;
    generate from a map database the plurality of available routes from the origin to the destination;
    in response to generating from the map database the plurality of available routes from the origin and the destination, calculate a radiation score for each of the plurality of available routes along each of the plurality of available routes from the origin to the destination based on the retrieved radiation information from the radiation database;
    in response to calculating the radiation score for each of the plurality of available routes, estimate the cumulative exposure to radiation for the GPS device going to receive from the at least one natural source of radiation while travelling along each of the plurality of available routes;
    in response to estimating the cumulative exposure to radiation by the GPS device, present an optimal route on a display screen based on an expected travel time and the radiation score for each of the plurality of available routes; and
    monitor the cumulative exposure to radiation in real-time and provide on the display screen real-time guidance along the optimal route for the GPS device.

14. The system of claim 13, wherein the processor is further configured to receive a selected route from the one or more of the plurality of available routes and providing real-time route guidance along the selected route.

15. The system of claim 13, wherein the processor is further configured to determine at least one of a health status of an individual in the vehicle and a radiation exposure status of the GPS device in the vehicle.

16. The system of claim 15, wherein calculating the radiation score for each of the plurality of available routes includes estimating the cumulative exposure to radiation for the individual based on the health status of the individual.

17. The system of claim 15, wherein the radiation score for each of the available routes is calculated based on a combination of at least two of the health status of the individual, the radiation exposure status of the GPS device and an estimated radiation level along each of the plurality of available routes between the origin and the destination.

18. The system of claim 15, wherein the processor is further configured to determine the optimal route based on a combination of at least two of the health status of the individual, the radiation exposure status of the GPS device, the radiation score of each of the plurality of available routes and the expected travel time on each of the plurality of available routes.

* * * * *